(12) United States Patent
Sutton et al.

(10) Patent No.: US 7,613,272 B2
(45) Date of Patent: Nov. 3, 2009

(54) METHODS OF USING FUEL BUNDLE GROUPS AS EVALUATION CONSTRAINTS

(75) Inventors: Steven B. Sutton, Wilmington, NC (US); David J. Kropaczek, Wilmington, NC (US); Christian C. Oyarzun, Wilmington, NC (US); Mehdi Asgari, Wilmington, NC (US)

(73) Assignee: Global Nuclear Fuel-Americas, LLC, Wilmington, NC (US)

( * ) Notice: Subject to any disclaimer, the term of this patent is extended or adjusted under 35 U.S.C. 154(b) by 0 days.

(21) Appl. No.: 12/213,853

(22) Filed: Jun. 25, 2008

(65) Prior Publication Data

US 2009/0010375 A1 Jan. 8, 2009

Related U.S. Application Data

(62) Division of application No. 11/128,354, filed on May 13, 2005, now Pat. No. 7,409,032.

(51) Int. Cl.
*G21C 19/00* (2006.01)
(52) U.S. Cl. .............. 376/267; 376/245; 376/260; 703/6; 703/2
(58) Field of Classification Search .............. 376/267, 376/245, 260; 703/6, 1, 13, 18
See application file for complete search history.

(56) References Cited

U.S. PATENT DOCUMENTS

| | | | |
|---|---|---|---|
| 5,093,070 A | 3/1992 | Koyama et al. | |
| 5,272,736 A | 12/1993 | Wolter et al. | |
| 5,631,939 A | 5/1997 | Haraguchi et al. | |
| 5,636,328 A | 6/1997 | Kautz et al. | |
| 5,859,885 A | 1/1999 | Rusnica et al. | |
| 5,923,717 A | 7/1999 | Fawks, Jr. | |
| 6,031,984 A | 2/2000 | Walser | |
| 6,259,756 B1 | 7/2001 | Reese et al. | |
| 6,404,437 B1 | 6/2002 | Russell et al. | |
| 6,748,348 B1 | 6/2004 | Russell | |
| 6,862,329 B1 | 3/2005 | Kropaczek et al. | |
| 6,931,090 B2 * | 8/2005 | Chao et al. .................. | 376/267 |
| 6,934,350 B1 | 8/2005 | Challberg et al. | |
| 7,200,541 B2 | 4/2007 | Kropaczek et al. | |
| 2004/0059549 A1 | 3/2004 | Kropaczek et al. | |
| 2004/0122629 A1 | 6/2004 | Russell et al. | |
| 2004/0151274 A1 | 8/2004 | Kropaczek et al. | |
| 2004/0220787 A1 | 11/2004 | Russell et al. | |
| 2004/0243370 A1 | 12/2004 | Kropaczek et al. | |
| 2005/0015227 A1 | 1/2005 | Kropaczek et al. | |
| 2005/0086036 A1 | 4/2005 | Kropaczek et al. | |
| 2005/0089831 A1 | 4/2005 | Russell et al. | |
| 2005/0222833 A1 | 10/2005 | Kropaczek et al. | |

* cited by examiner

*Primary Examiner*—Rick Palabrica
(74) *Attorney, Agent, or Firm*—Harness, Dickey & Pierce, PLC (57) ABSTRACT

A method of fuel bundle consideration in a reactor. The method includes creating or editing bundle groups including fuel bundles.

3 Claims, 9 Drawing Sheets

Filter Burnt Fuel

- ☑ K∞    > ▼   1.2
- ☑ Exposure   < ▼   2000
- ☑ Cycle

| | Cycle |
|---|---|
| ☑ | 2 |
| ☐ | 3 |
| ☑ | 4 |
| ☐ | |
| ☐ | |

- ☑ Pedigree

| | Status |
|---|---|
| ☑ | RU |
| ☑ | RP |
| ☐ | DC |
| ☐ | DD |

- ☑ Product Line

| | Product |
|---|---|
| ☑ | GE 11 |
| ☑ | GE 12 |
| ☐ | GE 6 |
| ☐ | GE 8 |

[OK]

[CANCEL]

FIG. 5

Fresh Bundle Type ~300

| BName | K∞ | Product Line | Avg. Enrich... | Gad V |
|---|---|---|---|---|
| wxy01 | 0.9988 | ⬆ Ascending | | 5.0 |
| wxy05 | 1.0 | ⬇ Descending | | 7.0 |
| wxy02 | 1.2302 | | | 10.0 |
| wxy04 | 1.3999 | GE 10test01 | 4.5 | 10.0 |
| wxy03 | 1.4 | GE 11test01 | 1.2 | 3.0 |

120
▶ ~130
▲ ~160
🗑 ~180

Fresh Bundle Pool ~400

402

| Type # | BName | K∞ | Product Line | Avg. Enrich... |
|---|---|---|---|---|
| 1 | | | | |
| 2 | | | | |
| 3 | | | | |

Total: 0    0 row(s) selected

Load ~184

| | | | |
|---|---|---|---|
| Fresh IAT Types allowed In Group | | | |
| ☐ | | 1 | GE14-P10DNAB426-16G6.0-100T-150-T6-2682 |
| ☐ | | 2 | GE14-P10DNAB390-14GZ-100T-150-T6-2683 |
| ☑ | | 3 | GE14-P10DNAB427-16GZ-100T-150-T6-21012 |
| ☑ | | 4 | GE14-P10DNAB387-16GZ-100T-150-T6-23011 |
| ☐ | | 5 | GE14-P10DNAB388-17GZ-100T-150-T6-2684 |
| ☐ | | 7 | GE9B-P8DWB335-10GZ-80U-150-T6 |
| ☐ | | 8 | GE9B-P8DWB335-11GZ-80U-150-T6 |
| ☐ | | 16 | GE13-P9DTB386-11G4.0/1G3,0-100T-146-T6-3958 |
| ☐ | | 17 | GE13-P9DTB225-NOG-100T-146-T6-2571 |
| ☐ | | 18 | GE14-P10DNAB394-7G5.0/6G4.0-100T-150-T6-2566 |
| ☐ | | 19 | GE14-P10DNAB394-8G5.0/6G4.0-100T-150-T6-2595 |
| ☐ | | 20 | GE14-P10DNAB394-12G5.0-100T-150-T6-2596 |
| ☐ | | 21 | GE14-P10DNAB427-16GZ-100T-150-T6-100021 |
| ☐ | | 22 | GE14-P10DNAB427-15GZ-100T-150-T6-100022 |
| ☐ | | 23 | GE14-P10DNAB425-16GZ-100T-150-T6-100023 |
| ☑ | | 24 | GE14-P10DNAB427-16GZ-100T-150-T6-100024 |
| ☐ | | 25 | GE14-P10DNAB427-16GZ-100T-150-T6-100025 |
| ☑ | | 26 | GE14-P10DNAB427-16GZ-100T-150-T6-100026 |
| ☑ | | 27 | GE14-P10DNAB387-15GZ-100T-150-T6-100027 |
| ☐ | | 28 | GE14-P10DNAB388-16GZ-100T-150-T6-100028 |
| ☑ | | 29 | GE14-P10DNAB384-16GZ-100T-150-T6-100029 |
| ☑ | | 30 | GE14-P10DNAB388-17GZ-100T-150-T6-100030 |
| ☐ | | 31 | GE14-P10DNAB387-16GZ-100T-150-T6-100031 |
| ☐ | | 40 | GE14-P10DNAB427-16GZ-100T-150-T6-100020 |
| | Save | | |

965  960  950  955

US 7,613,272 B2

METHODS OF USING FUEL BUNDLE GROUPS AS EVALUATION CONSTRAINTS

PRIORITY STATEMENT

This divisional application claims priority under 35 U.S.C. § 121 to application Ser. No. 11/128,354, filed May 13, 2005, now U.S. Pat. No. 7,409,032 the entire disclosure of which is herein incorporated by reference.

BACKGROUND

The information setting forth the placement of fuel bundles, each of which has various attributes, in a nuclear reactor core is referred to as the loading map. In conventional core design, creating the loading map is an experienced based, trial and error, iterative process.

The core designer generally receives plant specific critical to quality factors such as plant cycle energy requirements, thermal and operational limits, shut down margins, etc. The core designer will also have information on the layout of the reactor core; namely, an indication of the how the nuclear fuel bundles are positioned within the core. Some of the critical to quality factors may even concern the layout. For example, the core designer may receive input requiring the positioning of certain fuel bundles within the layout.

Given this information, the core designer then makes a guess, based on experience and various rules of thumb he may have developed over time, on the initial positioning of fuel bundles in the reactor core. Specifically, the core designer guesses how many fresh fuel bundles to place in the core, and what types of fresh fuel bundles to use. A fresh fuel bundle is a fuel bundle that has not been exposed. Fuel bundles of the same type have substantially the same attributes. The attributes include but are not limited to: uranium loading, average enrichment, gadolinia loading, number of axial zones, product line, and thermal-mechanical characteristics of the fuel bundles. Different types of fresh fuel bundles have one or more different attributes. In deciding how many fresh fuel bundles to use, the core designer is also deciding how many of the fuel bundles currently in the core to reuse. Reusing the fuel bundles currently present in the core can mean leaving a fuel bundle in its existing location, or moving the fuel bundle to a different location in the core.

As part of the core design, the core designer also determines other operational parameters of the reactor core such as control blade positions, core flow, etc. Having specified these operational control parameters, a Nuclear Regulatory Commission (NRC) licensed simulation program is then run on the initial core design. Based on the results of the simulation, the core designer utilizes experience and rules of thumb to fix perceived problems in the design and, in general, improve the design; particularly with respect to the critical to quality factors. These changes may include changing the loading map. The process repeats until the core designer is satisfied with the design.

SUMMARY OF THE INVENTION

In an embodiment of the present invention, at least one fuel bundle within a core is assigned into one of a plurality of bundle groups, the assignment being based on an associated fuel bundle characteristic. For example, the fuel bundle characteristic may be an exposure characteristic.

In another embodiment of the present invention, one of a plurality of bundle groups is selected. A grouping operation is performed on the selected bundle group.

In another example embodiment of the present invention, a plurality of fuel bundle groups in a current loading map is created. A first plurality of proposed loading maps is generated to establish potential core loading at a next cycle of operation. The plurality of proposed loading maps are filtered to create a second plurality of proposed loading maps, the second plurality of proposed loading maps satisfying at least one fuel bundle group constraint. An objective function is configured to evaluate the second plurality of proposed loading maps.

BRIEF DESCRIPTION OF THE DRAWINGS

The present invention will become more fully understood from the detailed description given herein below and the accompanying drawings, wherein like elements are represented by like reference numerals, which are given by way of illustration only and thus are not limiting on the present invention and wherein.

DETAILED DESCRIPTION OF THE EXEMPLARY EMBODIMENTS

To better understand the present invention, an example method of creating a template and loading map will be described. Then, a process of generating bundle groups within a loading map will be described. Finally, example implementations of bundle groups being used as a constraint during an optimization process will be given.

A Generic Architecture

Figure 1:
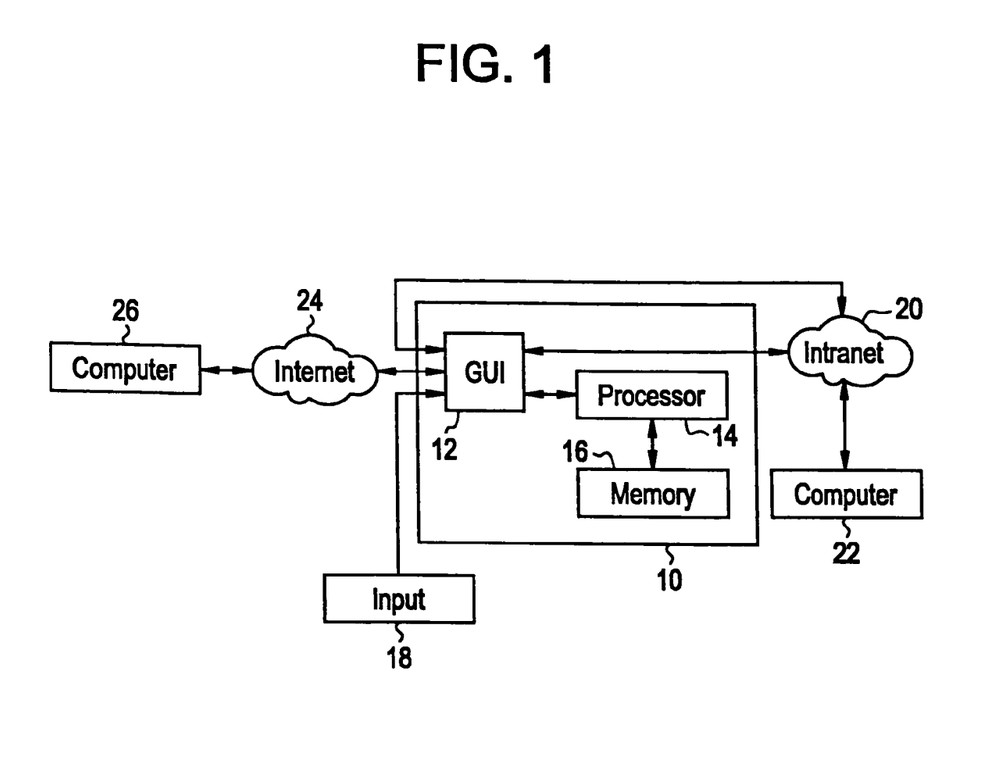
FIG. 1 illustrates an embodiment of an architecture according to the present invention.

FIG. 1 illustrates an embodiment of an architecture according to the present invention. As shown, a server 10 includes a graphical user interface 12 connected to a processor 14. The processor 14 is connected to a memory 16. The server 10 is directly accessible by a user input device 18 (e.g., a display, keyboard and mouse). The server 10 is also accessible by computers 22 and 26 over an intranet 20 and the Internet 24, respectively. The operation of the architecture shown in FIG. 1 will be discussed in detail below.

Creating a Template

Figure 2:
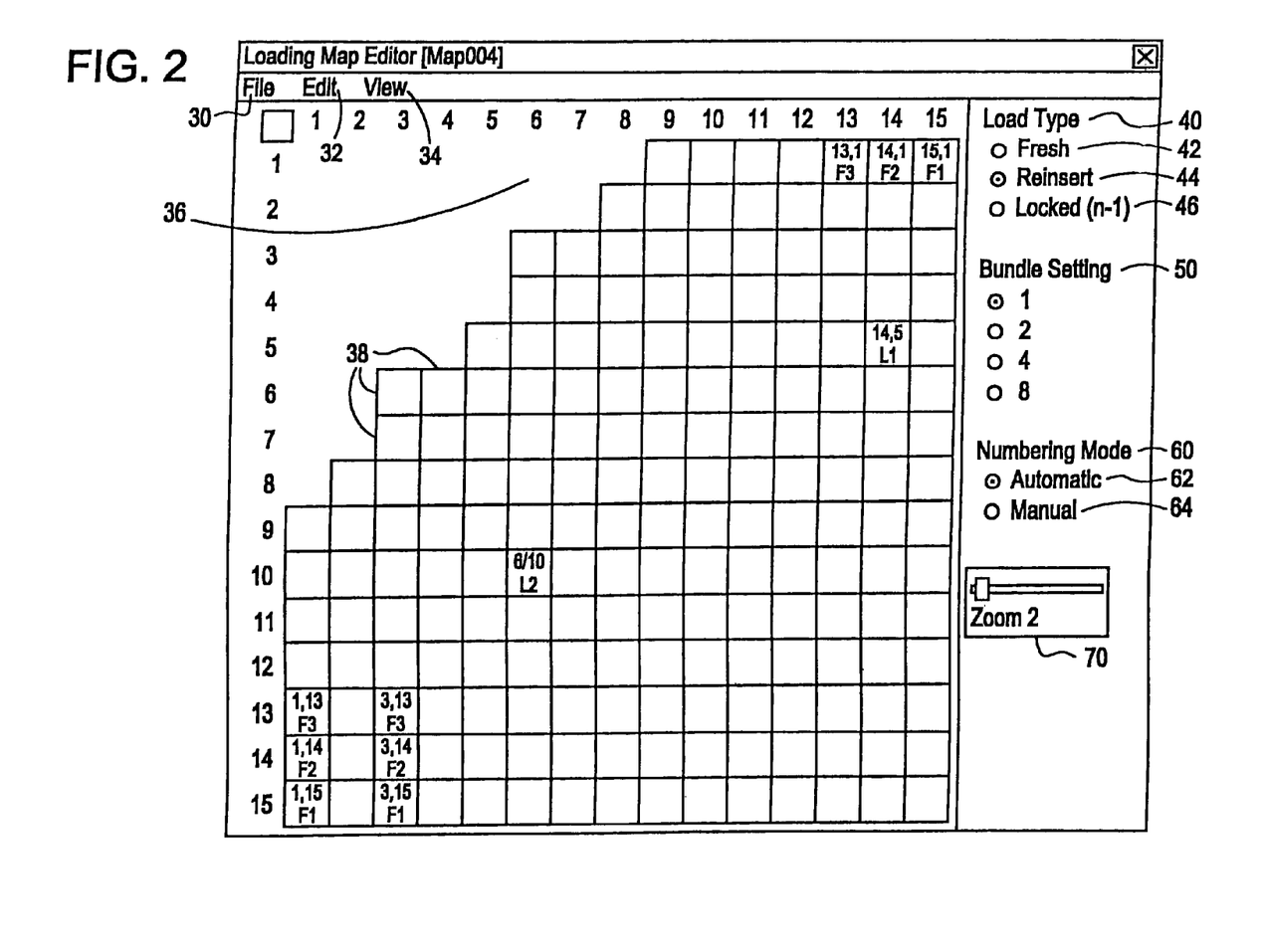
FIG. 2 illustrates a screen shot of a partially completed template designed according to the methodologies of the present invention using the loading map editor of the present invention.

A user via input 18, computer 26 or computer 22 accesses the server 10 over the graphical user interface 12, and runs a loading map editor program stored in memory 16 according to an exemplary embodiment of the present invention. The loading map editor provides for creating and editing a graphical representation of a nuclear reactor core referred to as a template. However, another form of conveying this information, such as a text file, may also be thought of as the template. FIG. 2 illustrates a quarter-core screen shot of a partially completed template designed according to the methodologies of the present invention using the loading map editor of the present invention.

When the loading map editor is initially run, the user has the option via a file menu 30 to access a previously created template or to begin a new template. Assuming the user begins a new template, the loading map editor requests the user to identify the nuclear reactor for which the template is being created. The loading map editor then retrieves the geometry of the identified nuclear reactor from a relational database containing nuclear reactor plant characteristics stored in the memory 18. The loading map editor then displays a blank colorless fuel bundle field 36 of the appropriate size based on the retrieved plant characteristics with the rows and columns numbered (such as with the fuel bundle position Row 6, Column 3 in FIG. 2).

Within the fuel bundle field 36, the user may then, for example, using a mouse associated with the input 18, computer 26 or computer 22 click on the fuel bundle positions 38 in the array of possible fuel bundle positions to identify the type (fresh, reinsert, or locked) and setting of the actual fuel bundle in that position. The user may then assign fuel bundles to one of a plurality of fuel bundle sets. Examples of criteria upon which a user may select the bundle set assignment will be described later.

As shown on the right side of FIG. 2, the loading map editor provides several tools for performing this assignment task. Specifically, the tools include the headings Load type 40, Bundle Setting 50 and Numbering Mode 60.

An example bundle set selection will now be described. Under the Load Type 40 tool heading, the loading map editor includes a Fresh radio button 42, a Reinsert radio button 44 and a Locked radio button 46. The Fresh, Reinsert and Locked radio buttons 42, 44 and 46 correspond to fresh, reinsert and locked fuel bundle categories. The user, for example, clicks on the desired radio button to choose the desired category and then clicks on the fuel bundle position 38 in the fuel bundle field 36 to assign that category to the fuel bundle position 38. The fresh fuel bundle category indicates to insert fuel bundles that have not been exposed. The loading map editor then displays "F" and a number "N" at the bottom of the fuel bundle position 38. The "F" indicates the fresh fuel bundle category, and the number "N" indicates the Nth fresh bundle type 38. As will be appreciated, the loading map editor maintains a count of the number of fuel bundle types assigned to the core. Multiple bundle positions can be assigned the same bundle type by specifying the same "F" and "N" value for each position.

The locked fuel bundle category indicates that a fuel bundle currently occupying an associated fuel bundle position in an actual nuclear reactor core is to remain in that position in creating a new nuclear reactor core loading map. The loading map editor displays "L" and a number "N" in the fuel bundle position 38 when the locked fuel bundle category is assigned. The "L" indicates the locked fuel bundle category, and the number "N" indicates the Nth locked bundle set.

The reinsert fuel bundle category indicates to insert a fuel bundle that has been exposed. The loading map editor displays only a number "N" in the fuel bundle position 38 when the reinsert fuel bundle category is assigned. The number indicates a priority of the fuel bundle position 38. The number and the priority indicated by the number will be described in detail below with respect to the Numbering Mode 60 heading.

In an exemplary embodiment, the loading map editor displays the fuel bundle positions 38 in a color associated with the assigned category. For example, fresh are displayed in blue, locked are displayed in yellow, and reinserted are displayed in violet.

Under the Bundle Setting 50 heading, the loading map editor includes a "1" radio button, a "2" radio button, a "4" radio button, and an "8" radio button. When the "1" radio button is selected by the user, for example, by clicking on the "1" radio button, the category assigned by the user to a fuel bundle position 38 is associated only with the fuel bundle position 38 chosen. Selecting the "2" radio button and assigning a category to a fuel bundle position 38 causes the category to be assigned to the selected fuel bundle position as well as the fuel bundle position 180 degrees symmetric to the selected fuel bundle position. Selecting the "4" radio button causes the loading map editor to request the user to choose between rotational and mirror symmetry. Rotational symmetry is an image property indicating there is a center point around which the object is turned a certain number of degrees and the object still looks the same (i.e., it matches itself a number of times while it is being rotated,). Mirror symmetry (or line symmetry) indicates a correspondence in size, shape, and relative position of parts on opposite sides of a dividing line. If the user assigns a category to a fuel bundle position when rotational symmetry is chosen, this causes the category to be assigned to the selected fuel bundle position as well as the fuel bundle position 38 in each of the other quadrants rotationally symmetric to the selected fuel bundle position. If the user assigns a category to a fuel bundle position when mirror symmetry is chosen, this causes the category to be assigned to the selected fuel bundle position as well as the fuel bundle position in each of the other quadrants symmetric to the selected fuel bundle position.

Selecting the "8" radio button causes the loading map editor to consider the total fuel bundle field 36 as octant symmetric—eight symmetric pie pieces. Assigning a category to a fuel bundle position when the "8" radio button is selected causes the category to be assigned to the selected fuel bundle position 38 as well as the fuel bundle positions 38 in each of the other eight pie pieces symmetric to the selected fuel bundle position 38.

Under the Numbering Mode 60 heading, the loading map editor includes an Automatic radio button 62 and a Manual radio button 64. Choosing between an automatic numbering mode by selecting the Automatic radio button 62 and a manual numbering mode by selecting the Manual radio button 64 is only permitted when the Reinsert radio button 44 or Fresh radio button 42 has been selected. The numbering mode in general is inapplicable when the Locked radio button 46 is selected.

When the Automatic radio button 62 is selected, the loading map editor, which maintains a count of the number of fuel bundle positions 38 assigned the reinsert fuel bundle category, assigns the count plus one to the next fuel bundle position 38 assigned the reinsert fuel bundle category. The assigned number is displayed at the bottom of the fuel bundle position 38. Likewise, the loading map editor maintains a count of the fresh bundle types. When a fuel bundle position 38 is assigned the fresh bundle category the count plus one, referred to above as N, is assigned to that position. "F" and the value of N are displayed at the bottom of the fresh fuel bundle position.

When the Manual radio button 64 is selected, the loading map editor maintains the count of the number of fuel bundle positions 38 assigned the reinsert fuel bundle category, but does not assign numbers to the fuel bundle positions 38. Instead, the user may position a cursor in the fuel bundle position 38 and enter the number manually. As alluded to above, the assigned numbers represent assigned priorities. The priorities indicate an order for loading exposed fuel bundles based on an attribute of the exposed fuel bundles. The attributes include, but are not limited to, K infinity (which is a well-known measure of the energy content of the fuel bundle), exposure of the bundle (which is accumulated megawatt days per metric ton of uranium in the bundle), residence time of the bundle (which is how long the bundle has been resident in the nuclear reactor core), etc. In one exemplary embodiment, the shade of the color associated with the reinserted fuel bundle positions varies (lighter or darker) in association with the assigned priority.

The loading map editor according to the present invention also provides several viewing options via a view menu 34 and a zoom slide button 70. Adjusting the zoom slide button 70 by clicking and dragging the zoom slide button 70 to the left and the right decreases and increases the size of the displayed fuel bundle field 36. Under the view menu 34, the user has the option to view a single quadrant of the template, or a full core view of the template. Additionally, the user can control whether certain template attributes are displayed. Specifically, the view menu 34 includes the options of displaying the following in the loading template: control blades, bundle coordinates, core coordinates, etc.

Having created the loading template, the user may save the template, or even a partially created template, to the memory 18 by selecting either the "Save" or "Save As" option in the file menu 30.

As discussed above, instead of creating a new template, a previously created template may be viewed and, optionally, edited. Using the file menu 30, the user selects an "open" option. The loading map editor then displays the accessible templates stored in the memory 18 or a directory of memory 18. The user then selects an accessible template, for example, by clicking on one of the accessible templates. The loading map editor will then display the chosen template.

The user may then edit the chosen template. For example, after selecting a fuel bundle position 38 the user may select under the edit menu to "clear" the category assigned to the fuel bundle position 38. Besides the category assigned to this fuel bundle position 38, the loading map editor also clears the category assigned to associated fuel bundle positions 38. Associated fuel bundle positions 38 are those fuel bundle positions 38 that were assigned the fuel bundle category along with the fuel bundle position 38 selected for clearing because of the bundle setting chosen when the category was assigned to the fuel bundle position 38 chosen for clearing.

When fuel bundle positions 38 assigned the fresh or reinserted category are cleared, the loading map editor adjusts the numbering associated with that category. In the case of the fresh bundle category, this is a conditional action based on whether other bundle positions have been assigned the same fresh bundle type. Specifically, the loading map editor performs a cascade operation such that fuel bundle positions assigned the same category and having higher numbers are renumbered in sequence beginning from the lowest number of a deleted fuel bundle position. For example, if reinsert bundle positions numbered 44, 43 and 42 were cleared, then reinsert bundle position having number 45 would be renumbered 42, reinsert bundle position having number 46 would be renumbered 43, etc. The loading map editor also changes the total count of fuel bundle positions assigned the category being cleared.

When unassigned bundle positions are created through editing, the user may then newly assign categories to the unassigned bundle positions in the same manner and using the same tools to create a template as described above. In so doing, the user may decide to manually assign, for example, an existing priority to a newly assigned reinsert fuel bundle position. In this instance, the reinsert fuel bundle position already having this number and each reinsert fuel bundle position having a higher number are incremented by one.

As a further alternative, the user may want to adapt an existing template for one reactor to another reactor of the same size and physical bundle configuration. To do this, the user may use the "save as" feature in the file menu 30 to create a duplicate of the loading template. Subsequent changes to the bundle field will then apply to the copied template.

In addition to creating a template from 'scratch' or editing an existing template, the user may have the loading map editor derive a template from a previously loaded core. In the loading map editor, using the file menu 30, the user selects an "auto-generate template" option. The loading map editor then displays a list of the accessible fuel cycles stored in the memory 18. Each fuel cycle corresponds to an actual loading map for a fuel cycle of a nuclear reactor. As will be appreciated, the memory 18 may store loading maps for cycles of different nuclear reactors. Accordingly, the list of cycles displayed by the loading map editor identifies both the nuclear reactor and the cycle. From the list the user selects the cycle (hereinafter "the selected cycle") that the template will be derived from. The loading map editor then accesses the loading map for the selected cycle.

The user is then presented with a dialog box for entering input parameters of the derivation process. The input parameters include: a primary attribute (e.g., exposure, K infinity, etc.) for deriving the template, a tolerance level (discussed in detail below), set list members (8, 4, or 2 bundle settings), bundle symmetry for sets of 4, and a maximum number of assignments to each set list member. For example the user may enter K infinity as the primary attribute, and a tolerance level of 0.2 (which, as described in detail below, is used for forming bundle sets). The user may further enter that sets of 8 and 4 are permitted, the sets of 4 should have mirror symmetry and that a maximum of 14 sets of 4 are permitted. In an exemplary embodiment, the loading map editor provides the user with a drop-down menu. The user selects list members desired for the template from the options given in the drop-down menu. These options include: sets of 8, 4 and 2; sets of 8 and 4; sets of 8 (which forces sets of 4 on the minor axis of the reactor core template); and sets of 4 and 2. In selecting the maximum number of assignments for each set, the user enters this data in the order of the smallest to the largest set size. However, the maximum number of assignments for the largest sets is not entered by the user, as this value is automatically determined based on the maximum number of assignments for the smaller sets.

Once the user enters the input parameters, the loading map editor will begin generating a template.

First the loading map editor asks the user if locked bundle positions are permitted, if so, then the loading map editor requests the user to identify the cycle previous to the selected cycle in the same manner that the selected cycle was identified. The loading map editor then compares the loading map for the selected cycle with the loading map for the previous cycle of the identified nuclear reactor. Specifically, for each bundle position in the reactor, the loading map editor determines if loading maps for the selected and previous cycles have a bundle with the same serial number in the same bundle position. If so, the bundle position is assigned the locked fuel bundle category in the loading template.

After the locked fuel bundle positions are identified, the loading map editor identifies the fresh fuel bundle positions. Specifically, for each bundle position not already identified as a locked bundle position, the loading map editor determines from the characteristics of the selected loading map if the fuel bundle in that bundle position is a fresh fuel bundle. For each identified fresh fuel bundle, the loading map editor also determines the type of fresh fuel bundle from the characteristics of the selected loading map. The loading map editor then assigns the fresh fuel category to the associated fuel bundle position in the template and assigns a type count number N to the fuel bundle position. For each type of fresh fuel bundle located in the selected loading map, the loading map editor assigns a count value to that type. This count value is then assigned to the bundle position along with the fresh fuel bundle category assignment so that fresh fuel bundle positions that should have the same type of fresh fuel bundle are identified by the same value 'N' in the loading template.

Next, the loading map editor determines whether the identified fresh bundle category positions form any bundle sets. As discussed above, the user identifies the bundle set members permitted in the template. The bundle set members form a set members list. For each bundle position assigned the fresh fuel bundle category, the loading map editor first determines if the bundle position (hereinafter the "current bundle position") has already been assigned to a set. If so, then the loading map editor proceeds to the next bundle position. If not, then the loading map editor selects the largest set from the set member list and identifies each of the bundle positions that form such a set with the current bundle position. If each of the bundles positions forming the set has been assigned the fresh bundle category and are of the same type as the current bundle position, then the loading map editor records the set of bundle positions as a set. If each of the bundle positions forming the set has not been assigned the fresh bundle category or one of the bundles is not the same type as the current bundle position, then the loading map editor performs the above-described process for the next largest bundle set in the set member list. This process keeps repeating until a set is formed or there are no more sets in the set member list to test. If the members of the set member list have been tested, and no set has been formed, then the current bundle position is recorded as not belonging to a set.

Next, the loading map editor identifies the reinserted fuel bundle positions. The bundle positions of the template not assigned to the locked or fresh fuel bundle categories are assigned the reinserted fuel bundle category. Then, the loading map editor determines whether the reinserted bundle category positions form any bundle sets. For each bundle position assigned the reinserted fuel bundle category, the loading map editor first determines if the bundle position (hereinafter the "current bundle position") has already been assigned to a set. If so, then the loading map editor proceeds to the next bundle position. If not, then the loading map editor selects the largest set from the set member list and identifies each of the bundle positions that form the set with the current bundle position. If each of the bundles positions forming the set has not been assigned the reinserted bundle category, then the loading map editor determines if the next largest set in the set member list includes all reinserted fuel bundle positions. If no set from the set member list results in a set of reinserted fuel bundles, then the loading map editor records the current fuel bundle position as not belonging to a set.

Once a set has been formed, the loading map editor calculates the average attribute value for the set. As discussed above, the user identified a primary attribute to use in deriving the template. Here, the loading map editor uses that attribute value for each fuel bundle in the selected loading map forming the associated set in the template to calculate the average attribute value. The loading map editor then determines if the attribute value for each fuel bundle in the set is with the tolerance level from the average attribute. Again, here, the tolerance level was a user input design parameter as discussed above.

If the attribute value for each fuel bundle in the set is within the tolerance level of the average attribute value, then the loading map editor records the associated fuel bundle positions in the template as belonging to a set. Otherwise, the loading map editor performs the above-described process for the next largest bundle set in the set member list. This process keeps repeating until a set is formed or there are no more sets in the set member list to test. If the members of the set member list have been tested, and no set has been formed, then the current bundle position is recorded as not belonging to a set.

The loading map editor then determines if the user specified maximum for a set in the set member list has been violated. If so the editor performs a set recombination and ranking process. For example, if the number of sets of 2 exceeds the user specified maximum the editor does the following: For each set of 2, the loading map editor determines if another set of 2 forms a set of 4 meeting the symmetry requirements entered by the user. The loading map editor then determines the average attribute value and standard deviation for each newly formed potential set of 4 and ranks the potential sets of 4 based on minimum standard deviation. Next, the highest ranked sets (i.e., those with the lowest standard deviation) are assigned to the sets of 4 until the sets of 2 list does not exceed the maximum number allowed based on the user input. Those potential sets of 4 not assigned remain as sets of two. Next, the same process is performed to combine sets of 4 into sets of 8 assuming the user input parameters permit sets of 8 and the user specified maximum for sets of 4 has been violated.

As a final step, the reinserted fuel bundles are assigned a priority number that, as described above, appears in the template. The fuel bundles positions are ranked based on (1) the attribute value for the fuel bundle in the associated position in the loading map if the fuel bundle position does not form part of a set; or (2) by the average attribute value of the set if fuel bundle position does form part of a set. A priority number is then assigned by this ranking with the fuel bundles having the same average attribute assigned the same priority number.

This completes the template derivation process, the resulting template is then displayed in the loading map editor allowing the user to save the resulting template for future use.

Using the present invention as described above, a core designer may capture his experience and rules of thumb associated with the initial design of a loading map. Furthermore, this knowledge may then be used by others to improve or adapt templates to existing core designs.

Creating Loading Map

The loading map editor according to the present invention includes additional functionality that allows the user to generate a loading map from the loading template. In addition, the loading map editor provides increased flexibility in creating the loading map by allowing the user the option of reloading fuel bundles currently residing in one or more fuel pools.

After accessing, creating and/or editing a reactor core template using the loading map editor as discussed above, the user may then create a loading map using the template. From the file menu 30, the user chooses a "load" option. The loading map editor then displays a loading screen that includes a template access window, template information window, reload window and a load fresh window. The template access window provides a user with a drop down menu for selecting a loading template stored in the memory 18. The template information window displays summary information for the selected loading template. The summary information includes, but is not limited to, the number of fresh bundle types, the number of reinserted fuel bundle positions and the number of locked bundle positions in the loading template. The summary information may also indicate the number of fresh bundle types and number of reinserted bundles currently added in creating the loading map.

Figure 3:
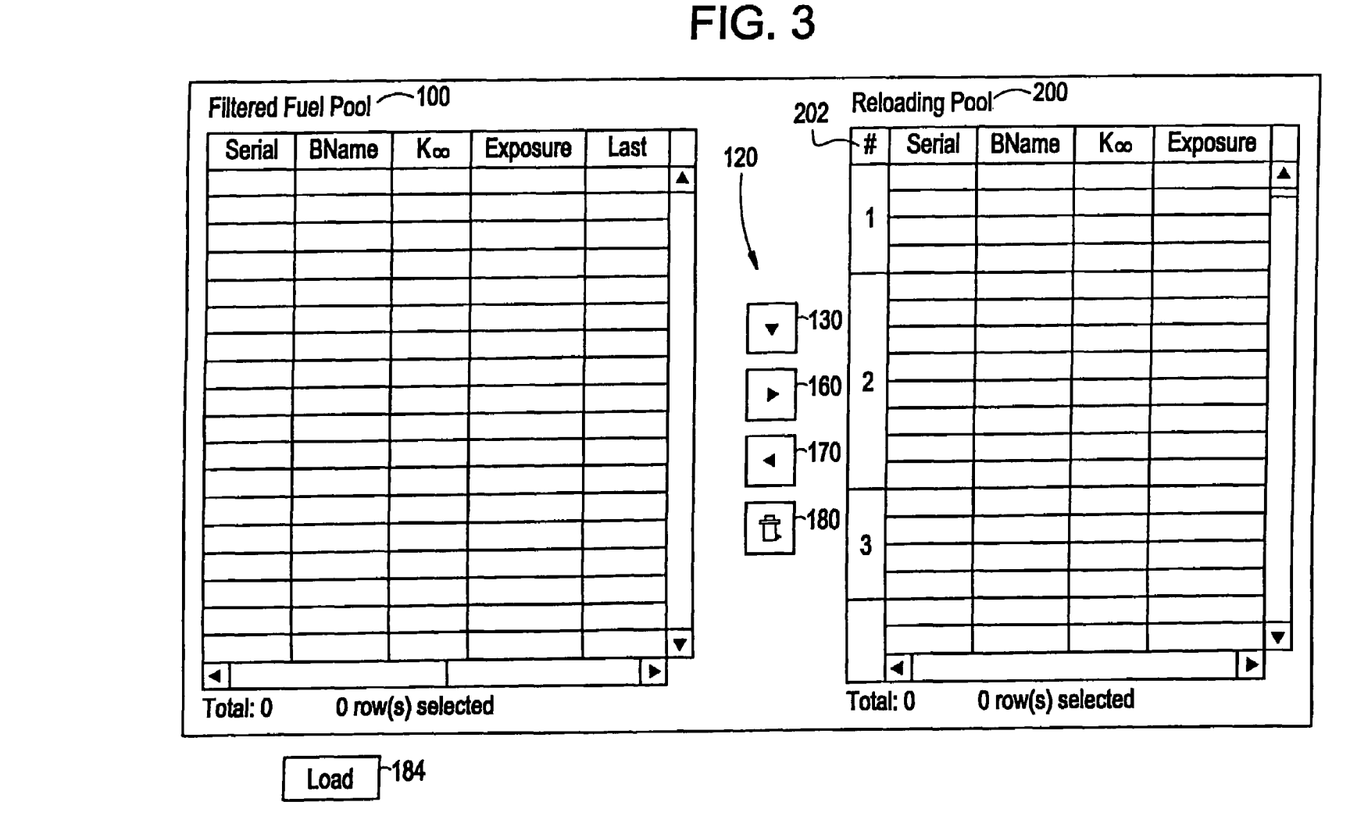
FIG. 3 illustrates a reload window displayed by a loading map editor of the present invention.

FIG. 3 illustrates an exemplary embodiment of a reload window displayed by the loading map editor. The window is divided into two parts: a filtered fuel pool table 100 and a reloading pool 200. The filtered fuel pool table 100 lists (1) the exposed fuel bundles currently in the nuclear reactor under consideration, except for those fuel bundles in locked fuel bundle positions 38, and (2) the fuel bundles in one or more fuel pools for this and other nuclear reactors. As is well-known, exposed fuel bundles removed from a nuclear reactor are stored in what is known as a fuel pool. Fuel bundles from two or more nuclear reactor cores located at a same site may be stored in the same fuel pool.

As shown in FIG. 3, the filtered fuel pool table 100 lists each exposed fuel bundle by its serial number and bundle name. Each fuel bundle is assigned a unique serial number, used to assure traceability of the bundle from a quality assurance perspective. The bundle name is a character string identifier used to identify the fuel bundle product line as well as nuclear characteristics, such as uranium and gadolinia loading. The filtered fuel pool table 100 also lists one or more attributes of each exposed fuel bundle listed. These attributes may include K infinity, exposure, and the last fuel cycle number for which the bundle was resident in the core. Additional attributes for an exposed fuel bundle may include: 1) bundle product line, 2) initial uranium loading, 3) initial gadolinium loading, 4) number of axial zones, 5) historical fuel cycle numbers previous to the most recent for which the bundle was resident in the core, 6) the corresponding reactor in which the fuel bundle was resident for each of the historical fuel cycles, 7) accumulated residence time, and 8) fuel bundle pedigree, a parameter that reflects the usability of the bundle for continued reactor operation.

The fuel bundle pedigree is determined from a number of factors the foremost being an inspection of the fuel, either visually or by some other non-destructive test procedure, which is designed to detect a current failed fuel bundle or the vulnerability of the bundle to future failure. Failure mechanisms include such items as corrosion, debris impact, and mechanical bowing of the fuel bundle. Another factor affecting pedigree is possible reconstitution of a fuel bundle, which is a repair process involving the replacement of damaged fuel rods with replacement rods that may be a uranium containing fuel rod or alternatively, a non-uranium containing rod (e.g. stainless steel), henceforth referred to as a 'phantom' rod. A pedigree attribute might be 'RU' and 'RP' for reconstituted with uranium and phantom rods, respectively, and 'DC', 'DD' and 'DB' for damaged by corrosion, debris, and bow, respectively. A 'blank' pedigree attribute would designate a bundle that was undamaged and useable.

All attributes with the exception of bundle pedigree are populated within the database via a direct relationship with the historical fuel cycles. The fuel pedigree attribute for non 'blank' designations are entered into the database via a separate process that is tied to fuel inspection and reconstitution services. In this process, the fuel bundles in a fuel pool are inspected and the pedigrees of the fuel bundles ascertained from the inspection. Then, a bundle status program is accessed. The bundle status program provides a GUI menu for 'Fuel Inspection', which is accessed by the user. The user clicks on the pulldown menu 'Add' from the 'Fuel Inspection' menu, and is presented with a pop-up for typing in the bundle serial number and the pedigree designation, such as 'DD' corresponding to a debris damaged bundle. The pedigree data entered in this manner is associated with the fuel pool database. The user may also click a 'Census' option from the 'Fuel Inspection' menu. Selecting this option will perform a query of the fuel pool database and present the user with a list of bundle serial numbers and corresponding attribute data, as described previously, for those bundles containing a non-null pedigree designation. The user may elect to change existing pedigree information by selecting the bundle entry, right-clicking a 'Modify' option, which activates the pedigree attribute field, and entering the modified pedigree information. For example, a bundle that was previously damaged may have been reconstituted. Alternatively, the user may right-click a 'Delete' option, which has the effect of reverting the bundle pedigree status back to null.

The reloading fuel pool table 200 provides the same information for each fuel bundle as provided by the filtered fuel pool table 100. Additionally, the reloading fuel pool table 200 indicates the priority number 202 for each fuel bundle set as set forth in the loading template. As discussed above with respect to the loading template, reinserted fuel bundles may be assigned as a set of 1, 2, 4 or 8 bundles. Accordingly, FIG. 3 shows that the highest priority reinserted fuel bundle position(s) are a set of four fuel bundles, and the next highest priority reinserted fuel bundle(s) are a set of eight fuel bundles.

The reloading fuel pool table 200 is populated by moving fuel bundles from the filtered fuel pool table 100 into the reloading fuel pool table 200. As further shown in FIG. 3, the reload window further includes a set of tools 120 for aiding the user in selecting and moving fuel bundles from the filtered fuel pool table 100 to the reload fuel pool table 200. The set of tools 120 include, but are not limited to, a filter tool 130, a move right tool 160, a move left tool 170 and a delete tool 180.

Figure 4:
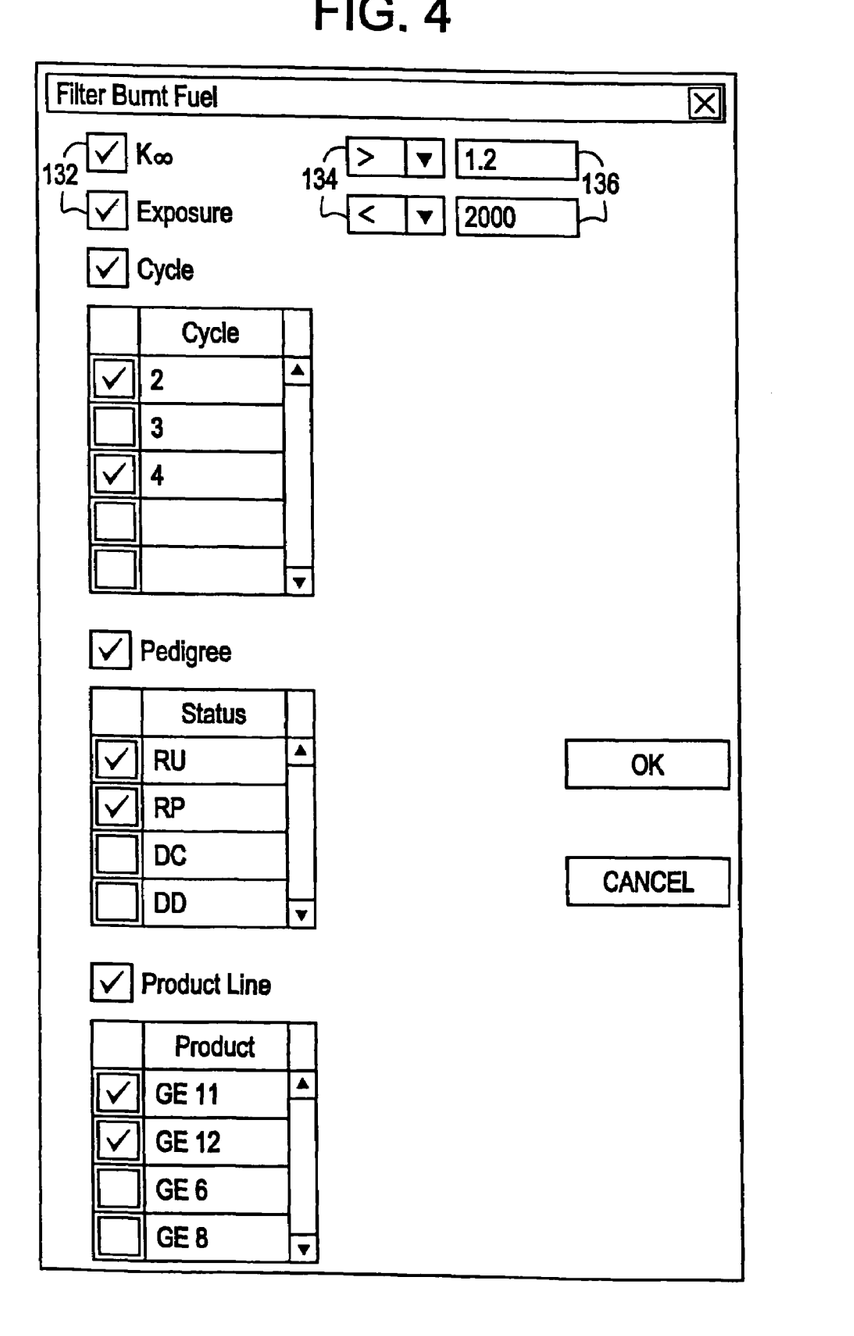
FIG. 4 illustrates a filter window displayed by a loading map editor of the present invention.

A user selects the filter tool 130 by, for example, clicking on the filter tool 130. This opens a filter window as shown in FIG. 4. As shown, the filter window lists the same attributes listed in the filtered fuel pool table 100, and allows the user to indicate to filter based on the attribute by clicking in the selection box 132 associated with the attribute. When an attribute has been selected, a check is displayed in the associated selection box 132. The user may also unselect an attribute by again clicking in the associated selection box. In this case, the check mark will be removed.

For each attribute, the filter window may display one or more filter characteristics associated with the attribute. For example, for the filter characteristics of the K infinity attribute, the user may select a filter operator 134 of greater than, less than, or equal to and enter in a filter amount 136 associated with the filter operator 134. As shown in FIG. 4, a user has selected to filter based on K infinity, chosen the greater than filter operator, and entered the filter amount of 1.2. As a result, the loading map editor will filter the fuel bundles in the filtered fuel pool table 100 to display only those fuel bundles having a K infinity greater than 1.2. As another example, the exposure attribute also has an associated filter operator and filter amount.

As will be appreciated, the filter characteristics of an attribute will depend on the attribute. Also, as will be appreciated, other methodologies for indicating the filter characteristics may be possible. For example, for the cycle attribute, the filter window provides a drop down menu for selecting the cycle number. FIG. 4 shows cycles 2 and 4 selected from the drop down menu for the cycle attribute. As a result, the loading map editor filters the filtered fuel pool table 100 to display only those fuel bundles whose most recent residence was in cycle 2 or cycle 4. Similarly, the user may elect to filter bundles based on their pedigree, product line, etc. Once the attributes for filtering on have been selected and the filter characteristics have been entered, the user causes the loading map editor to filter the filtered fuel pool table based on this information by clicking on the OK selection box. Alternatively, the user may cancel the filter operation by clicking on the CANCEL selection box.

The filtered fuel pool table 100 also provides a filtering mechanism for filtering the fuel bundles listed therein. A user may sort the filtered fuel pool table 100 in ascending or descending order of an attribute by clicking on the attribute heading in the filtered fuel pool table 100. Once the user clicks on the attribute, the loading map editor displays a popup menu with the options "Sort Ascending" and "Sort Descending". The filtered fuel pool table 100 is then filtered in ascending or descending order of the attribute based on the option clicked on by the user.

To move fuel bundles from the filtered fuel pool table 100 to the reload fuel pool table 200, the user selects the fuel bundles for transfer by clicking and dragging to highlight one or more of the fuel bundles in the filtered fuel pool table 100. Then the user clicks on the move right tool 160. This causes the selected fuel bundles to populate the highest priority unpopulated fuel bundle positions in the reload fuel pool table 200. Alternatively, a user clicks and drags the highlighted fuel bundles into one of the priority sections of the reloading fuel pool table 200.

Fuel bundles may also be moved from the reload fuel pool table 200 back into the filtered fuel pool table 100 by selecting fuel bundles in the reload fuel pool table 200 and clicking on the move left tool 170. Alternatively, the selected fuel bundles may be clicked and dragged back to the filtered fuel pool table 100.

The delete tool 180 provides the user with the function of deleting fuel bundles from either the filtered or reload fuel pool tables 100 and 200. The user may select one or more fuel bundles in one of the tables, and click the delete tool to delete the selected fuel bundles from the table.

Figure 5:
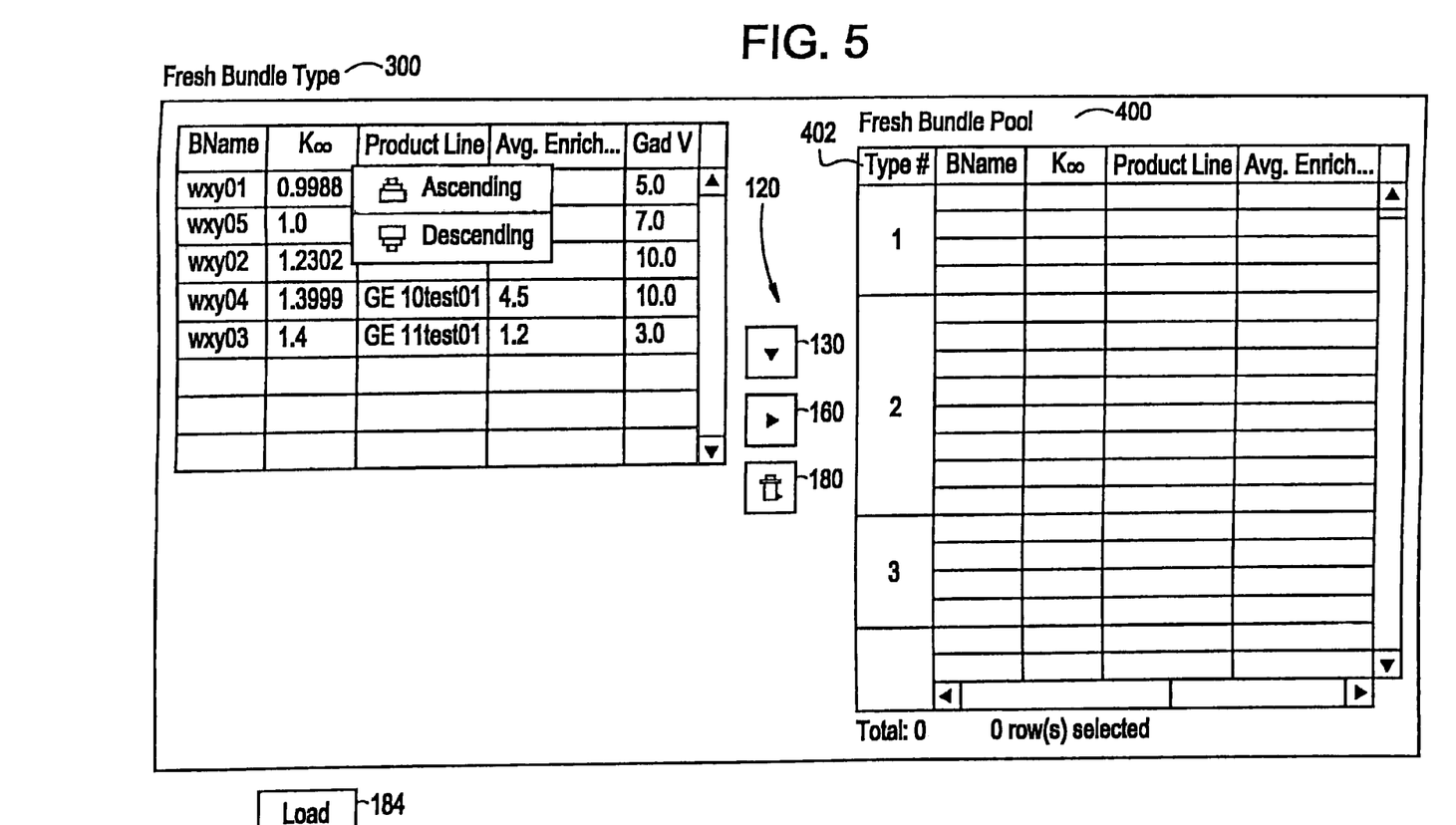
FIG. 5 illustrates a load fresh window displayed by a loading map editor of the present invention.

Next, the loading of fresh bundles into the template will be described. FIG. 5 illustrates an exemplary embodiment of a load fresh window displayed by the loading map editor. The window is divided into two parts: a fresh bundle types table 300 and a fresh bundle pool table 400. The fresh bundle types table 300 lists the available fresh fuel bundle types.

As shown in FIG. 5, the fresh bundle types table 300 lists each fresh fuel bundle type by its bundle name. The bundle name is a character string identifier used to identify the fuel bundle product line as well as nuclear characteristics, such as uranium and gadolinia loading. The fresh fuel bundle types table 300 also lists one or more attributes of each fresh fuel bundle type listed. These attributes may include K infinity, fuel bundle product line, average uranium-235 enrichment, percent (as a function of total fuel weight) of gadolinia burnable poison contained in the fuel bundle, number of gadolinia-containing fuel rods, and number of axial zones, where an axial zone is defined by a cross-sectional slice of the bundle that is homogeneous along the axial direction. Other attributes of the fresh bundle may include parameters for predicted thermal behavior, such as R-factors and local peaking, calculated for various bundle exposure values. R-factors are used as inputs to the critical power ratio (CPR) and are determined from a weighted axial integration of fuel rod powers. Local peaking is a measure of the fuel rod peak pellet and clad temperature.

The fresh bundle pool table 400 provides the same information for each fuel bundle as provided by the fresh bundle types table 300. Additionally, the fresh bundle pool table 400 indicates the type number 402 for each type of fresh bundle in the loading template and then number of fresh fuel bundles of that type in the loading template. FIG. 5 shows that the first type of fresh fuel bundle position(s) are a set of four fuel bundles, and the next type of fresh fuel bundle(s) are a set of eight fuel bundles.

The fresh bundle pool table 400 is populated by moving fuel bundles from the fresh bundle types table 300 into the fresh bundle pool table 400. As further shown in FIG. 5, the load fresh window includes the same filter tool 130, move right tool 160 and delete tool 180 for aiding the user in selecting and moving fuel bundles from the fresh bundle types table 300 to the fresh bundle pool table 400 as already described above. As will be appreciated, because the attributes for the fresh fuel bundles are different than the reinserted fuel bundles the filtering characteristics may also differ accordingly. The loading map editor also provides, as shown in FIG. 5, for filtering the fresh bundle types table 300 in ascending or descending order of an attribute in the same manner that the filtered fuel pool table 100 may be sorted.

The selection and moving process for fresh fuel bundles does differ from the process for moving burnt fuel because the destination of the fuel must be chosen in the set fresh fuel bundle pool table 400 located on the right side of the fresh bundle types table 300. Namely, after a user selects the fresh bundle type from the fresh bundle types table 300, the user then selects one or more fuel bundle positions in the fresh fuel bundle pool table 400. By selecting the move right tool 160, the selected fuel bundle positions in the fresh fuel bundle pool table 400 are populated with the selected fresh bundle type. Alternatively, the user may click and drag the bundle type into the fresh fuel bundle pool table 400. Unlike with the filtered fuel pool table 100, the fresh fuel types are not removed from the fresh bundle types table 300 but are, instead, copied as fuel bundles into the fresh bundle pool table 400.

Figure 7:
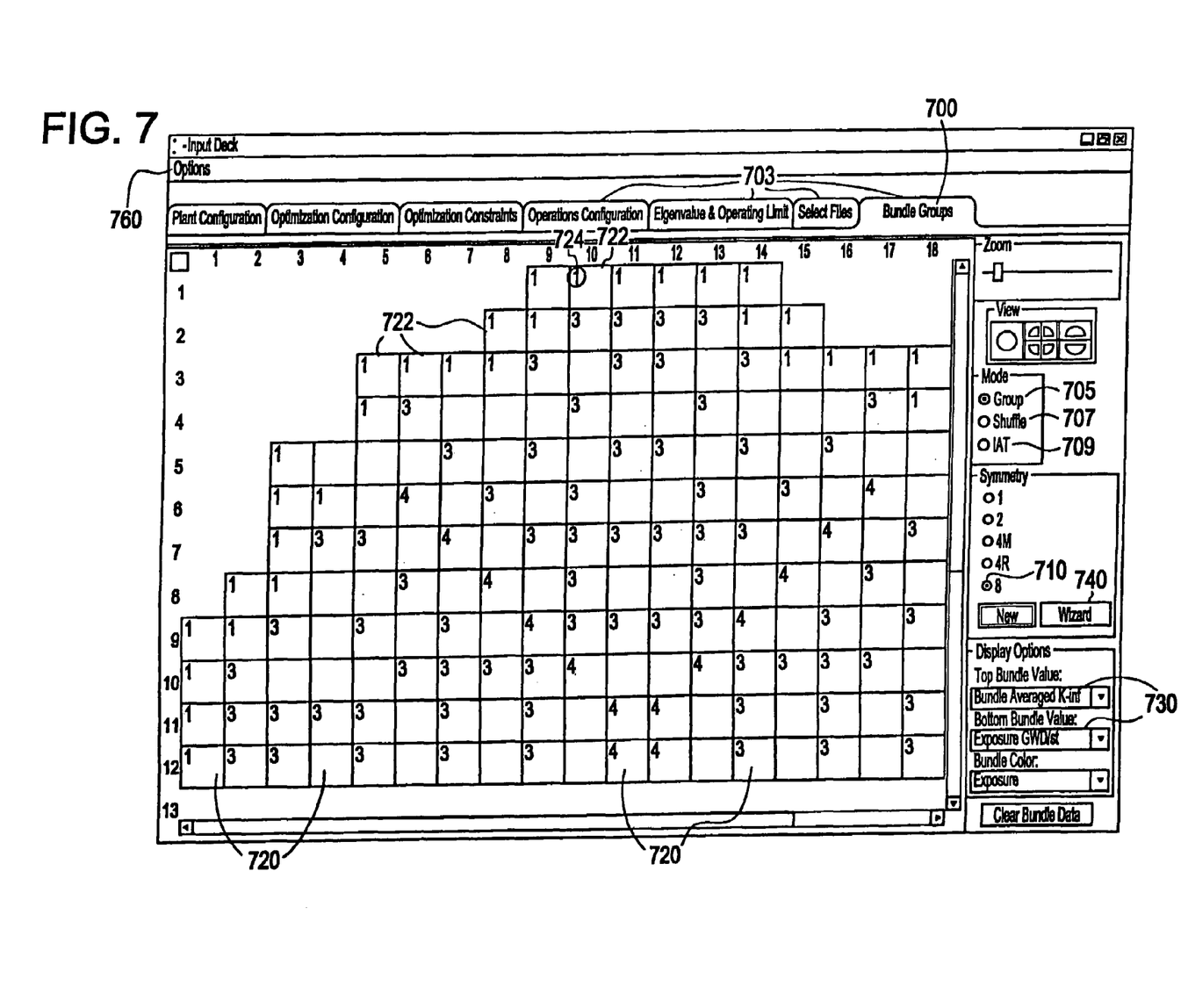
FIG. 7 illustrates a screen shot of a portion of the available fuel bundle positions within a loading map according to the methodologies of the present invention.

Once the reinserted and fresh fuel bundle positions 38 are filled using the tools described in detail above, the user may click on a "Load" button 184 displayed in the loading screen. This step performs the assignment of the fresh and reinserted fuel bundles from the fresh bundle pool list 400 and reloading pool 200, respectively, to the physical I,J locations in the core loading map. The core loading map is then displayed to the user as shown in FIG. 7. The user may then save the created loading map by choosing "Save" or "Save As" from the Options Menu 760 within FIG. 7.

Further refinement of the core loading map may be performed. The user has the option of performing a "swap" or exchange of two bundles, which may be between either fresh or reinserted bundles. The user enters "Shuffle" by clicking on a "shuffle" radio button 707 under "Mode". The user then selects a symmetry 710 followed by selection of a first and second location within the core loading map. All symmetric partners of the first location will exchange with all symmetric partners of the second location. While in shuffle mode, this process may be repeated to perform any number of rearrangements of fresh and reinserted fuel within the core loading map.

A second refinement to the core loading map involving a change in the fresh fuel bundle design (i.e. a change in fresh fuel type or IAT, a number assigned to a specific fuel bundle design within the loading map) may be performed. The user enters "IAT" mode by clicking on a "IAT" radio button 709. The IAT is a designation of a fuel bundle type (e.g., IAT 1, IAT 2, etc. . . . ). For example, a given IAT number may be reserved for fresh fuel bundles. The user selects a symmetry and then clicks on a fresh location in the core loading map. A pop-up window appears with an IAT pull-down, from which the user selects a new IAT for the targeted location (along with the symmetric partners of the targeted location). While in IAT mode, the process of changing fresh bundle types within fresh core locations may be repeated any number of times.

Having created the loading map, the user may then perform simulations on reactor core performance, etc. using the loading map created according to the methodologies of the present invention. The "Shuffle" and "IAT" modes for refining the loading map may be performed iteratively with the simulating step, with the results from the simulation being used as a guide to facilitate improvement to the core loading map.

By allowing the user to draw on the resources of the fuel pool(s), the present invention provides for greater flexibility in the creation of the loading map and may also reduce the overall cost in loading a nuclear reactor core.

Creating Bundle Groups

Once a loading map has been generated (e.g., with the above described methodology), a core designer may assign fuel bundles into one of a plurality of bundle groups. The bundle groups are generated with attributes that define the bundle group.

Figure 6:
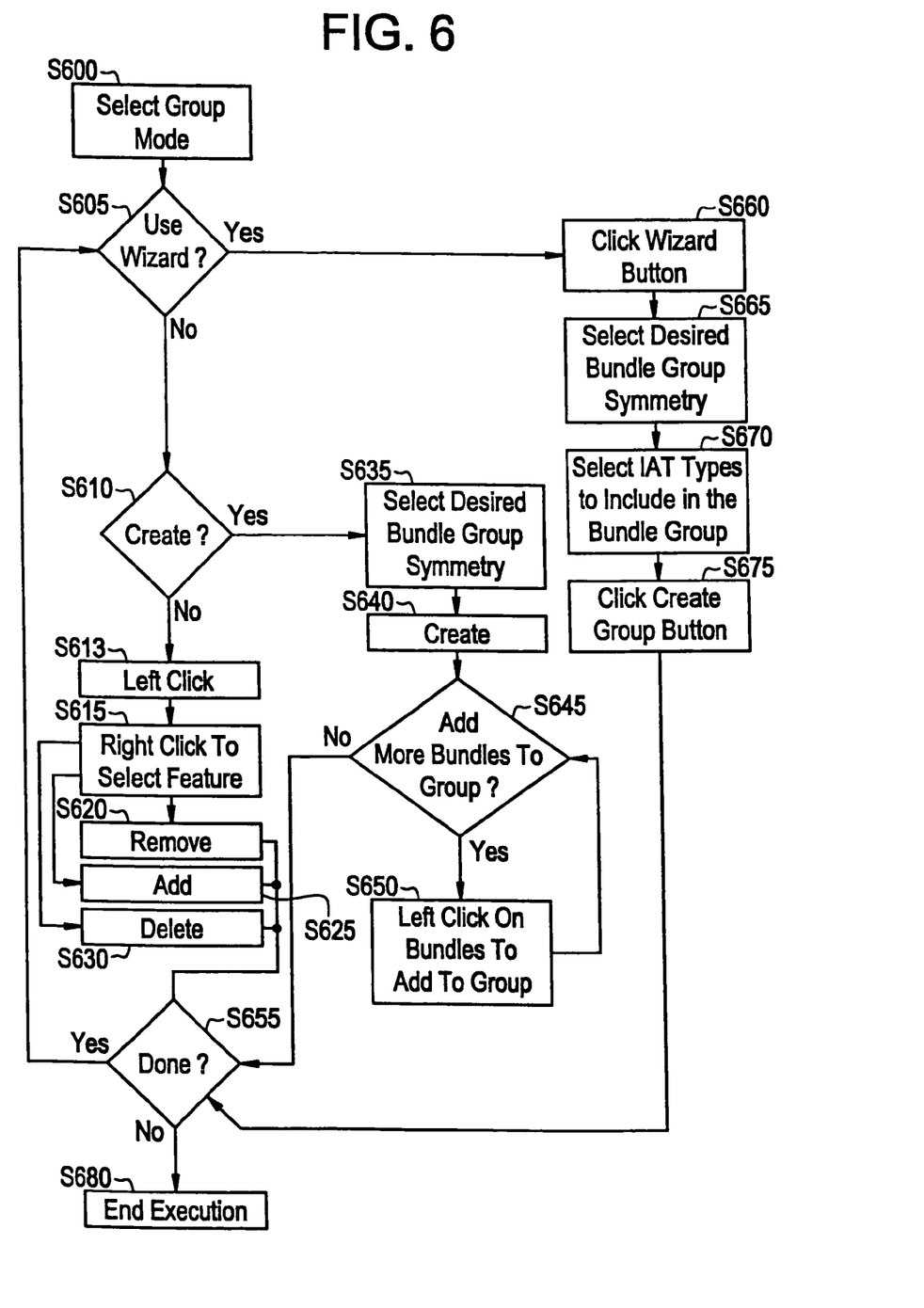
FIG. 6 illustrates a flow chart of a process for creating bundle groups.

FIG. 6 illustrates a flow chart of a process for creating bundle groups. Referring to FIG. 6, in step S600, a core designer enters a group mode within an input deck of a loading map editor. This step will be described with reference to FIG. 7. FIG. 7 illustrates a screen shot of a portion of the fuel bundles within a loading map according to the methodologies of the present invention. As shown, the loading map includes a plurality of fuel bundles 720. The position of the fuel bundles 720 as viewed in the loading map relates to the position of the fuel bundles 720 in the core. Further, each of the fuel bundles 720 includes displayed data associated with the fuel bundles 720. For example, as shown in FIG. 7, the displayed data includes a bundle group number (in the top left portion of fuel bundles 720 associated with a given bundle group), bundled average K infinity (K-inf) (not shown) (e.g., in the center portion of fuel bundles 720), and the exposure in GigaWatt Days/short ton (GWD/st) (not shown) (e.g., in the bottom portion of fuel bundles 720).

As shown, a core designer utilizing the above-described loading map editor enters a Group Mode by selecting a tab "Bundle Groups" 700 from a plurality of tabs 703. Then, the core designer selects group mode 705 from a plurality of mode options (e.g., group 705, shuffle 707, IAT 709).

Referring to FIG. 6, in step S605, the core designer determines whether to execute a grouping operation manually or with a Wizard. The Wizard is a software tool which may be used to automate bundle group generation. If the core designer decides to execute the grouping operation manually, the core designer may assign fuel bundles to bundle groups through a bundle by bundle, iterative process and the process advances to step S610. In this embodiment, the core designer analyzes each fuel bundle individually and determines to which bundle group the fuel bundle under consideration is to be assigned based on at least one of a plurality of attributes. The criteria the core designer may consider when generating or editing bundle groups will be described later.

In step S610, the core designer chooses between performing a grouping operation on an existing bundle group (or individual fuel bundle belonging to a bundle group) or performing a grouping operation on newly-created bundle group. If the user selects performing a grouping operating on an existing bundle group, then in step S613, the core designer selects a bundle group on which to execute a grouping operation. The core designer left clicks a fuel bundle belonging to the selected bundle group. Referring again to FIG. 7, fuel bundles 720 represent a sample of the available fuel bundles which the core designer may click to designate a bundle group. Fuel bundles 722 represent fuel bundles belonging to a bundle group selected by the core designer. As shown, the selected fuel bundles 722 are highlighted and each belong to the same group (i.e., group "1"). The group number for group "1" is displayed by group designation number 724. Group designation number assignment will be described later. Thus, group "1" is set to an active state, which means that grouping operations will affect group "1" until the core designer sets another group to the active state.

Then, in step S615, the core designer right clicks on a selected fuel bundle and a list of available grouping operations associated with the fuel bundle become available. If the selected fuel bundle belongs to a group, the available grouping operations include 1) Remove Bundles From Group and 2) Delete Group. If the selected fuel bundle does not belong to a group, the available grouping operations only 3) Add Bundles to Group. The grouping operation of 4) Create Group is not available here and will be described later with respect to steps proceeding from step S635.

The core designer selects one of the available grouping operations and left clicks the selected operation with the mouse. If 1) Remove Bundles From Group is clicked, the process advances to step S620. If 2) Add Bundles To Group is clicked, the process advances to step S625. If 3) Delete Group is clicked, the process advances to step S630.

In step S620, the selected fuel bundle and its symmetric partners (e.g., the fuel bundles associated with the selected fuel bundles based on the symmetry being 1, 2, 4M, 4R, 8, etc.) are removed from their bundle group and reset to a status of not belonging to a group. Thus, the group designation number in the upper left portion of the fuel bundle is removed. The process may then advance to step S655.

In step S625, the selected fuel bundle and its symmetric partners are added to the group selected in step S613. The group designation number in the upper left portion of the selected fuel bundle and its symmetric partners is set to match the group designation number of the selected group. The process may then advance to step S655.

In step S630, the group selected in step S613 is deleted entirely. Thus, each fuel bundle in the loading map belonging to the selected group is reset to a status of not belonging to a group. The group designation number for each fuel bundle in the group is removed from the upper left portion of the fuel bundle. The process may then advance to step S655.

In step S655, the execution of the grouping operation is completed. If another grouping operation is required, the process advances back to step S605. If another grouping operation is not required, the process advances to step S680. In step S680, no additional steps are required and all operations required by the core designer are complete. The core designer may select another of the plurality of tabs to enter another feature of the loading map editor or exit from the loading map editor.

Returning to step S610, if the core designer chooses to create a new bundle group, then in S635, the core designer selects a desired bundle group symmetry (e.g., 1, 2, 4M (Mirror), 4R (Rotational), and 8). The core designer left clicks the selected bundle group symmetry. Referring to FIG. 7, a symmetry 710 of 8 is selected by the core designer. The process may then advance to step S640.

In step S640, the core designer selects a first fuel bundle to form the new bundle group. In one embodiment, the core designer may left click on the New tab. The core designer then left clicks on a fuel bundle not belonging to a bundle group in step S650. The fuel bundle is added to the new group and given a group designation number. The group designation number is the lowest unique natural number available for group designation. For example, if groups "1", "2" and "3" currently exist in the loading map, the new group would be designated as group "4". In this example, the number "4" would appear in the upper left portion of each fuel bundle assigned to group "4". In another example, if groups "1", "3" and "4" currently exist in the loading map, the new group would be designated as group "2". In this example, the number "2" would appear in the upper left portion of the fuel bundle assigned to group "2".

Alternatively, in another embodiment of step S650, instead of left clicking the New tab, the core designer right clicks a fuel bundle not belonging to a bundle group. Available grouping operations become available to the core designer. The only available grouping operation for the fuel bundle not belonging to a bundle group is 4) Create Group. The core designer left clicks on the 4) Create Group operation. The fuel bundle is then added to the new group as described above with respect to the New tab embodiment.

After the first fuel bundle is assigned to the new group, the process advances to step S645. In step S645, the core designer decides whether more fuel bundles will be added to the newly created bundle group.

Generally, bundle groups are designated as either exposed or fresh. Fresh bundle groups include only fresh fuel bundles. Exposed bundle groups may include fresh fuel bundles. However, in "mixed" bundle groups, each of the included fuel bundles are treated as exposed (e.g., with respect to swapping operations) regardless of whether the includes fuel bundles are fresh or exposed.

In one embodiment, at least three fuel bundles per symmetry section are required in an exposed bundle group since this is the minimum number of fuel bundles required for a swapping operation only including fuel bundles within the symmetry section, which will be described later.

If the core designer chooses to add an additional fuel bundle to the newly created bundle group, the process returns to step S650. Otherwise, the process advances to step S655.

Returning to step S605, if the core designer chooses to use the Wizard, then the core designer left clicks on the wizard button shown in FIG. 7 in step S660.

Figure 8:
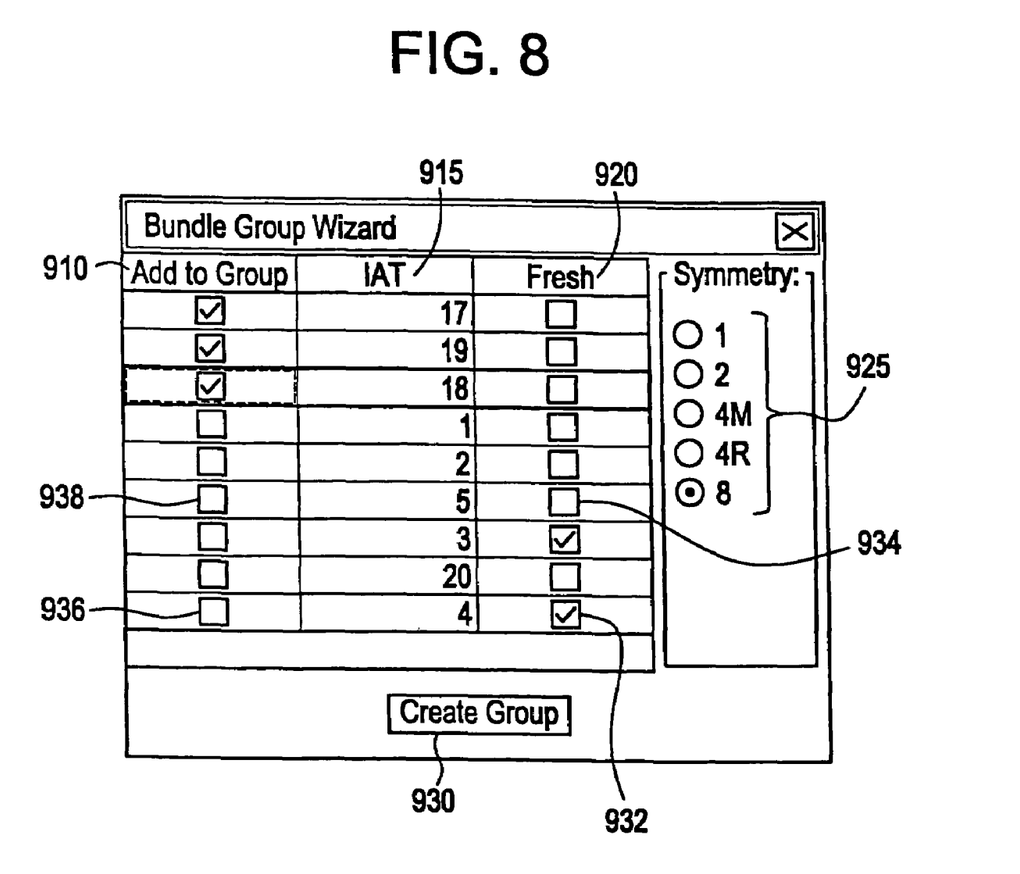
FIG. 8 illustrates a screen shot of a Wizard window according to the methodologies of the present invention.

FIG. 8 illustrates a screen shot of a Wizard window according to the methodologies of the present invention.

Referring to FIG. 8 with respect to step S660 of FIG. 6, when the core designer left clicks on the wizard button 740, a window 905 including an Add to Group column 910, an IAT column 915, a Fresh Column 920, symmetry options 925, and a Create Group button 930 become available to the core designer. The 1) Add to Group column 910 includes input tabs and the 2) IAT and 3) Fresh columns 915/920 include indicators to the core designer. The 2) IAT column 915 displays all available IATs to the core designer. The 3) Fresh column 920 indicates whether the IAT in an associated row is fresh. If the indicator is checked (e.g., indicator 932), the IAT is fresh. If the indicator is not checked (e.g., indicator 934), the IAT is not fresh.

Returning to FIG. 6, in step S665, the core designer selects a desired bundle group symmetry (e.g., 1, 2, 4M (Mirror), 4R (Rotational), and 8) from the available symmetry options. The core designer left clicks the desired bundle group symmetry 925 and the process advances to step S670.

In step S670, the core designer selects IAT types (i.e., bundle types) to add to the new bundle group. The core designer left clicks the input tabs in the Add to Group Column 910 in the same row as the desired IAT type. For example, the core designer may left click on the input tab 936 associated with a fresh IAT type (e.g., the fresh indicator for that row is checked). Thereafter, only additional input tabs associated with fresh IAT types may be added to the new bundle group with the Wizard. However, either fresh or exposed fuel bundles may still added manually. Alternatively, if the core designer initially selects an input tab 938 that is not associated with a fresh IAT type (e.g., the fresh indicator for that row is not checked), only additional input tabs not associated with fresh IAT types may be added to the new bundle group with the Wizard. However, either fresh or exposed fuel bundles may still be added manually. After the core designer completes selection of IAT types to be added to the new group, the process advances to step S675.

In step S675, the core designer clicks on the Create Group button 930 within the window 905 of the Wizard tool. Each fuel bundle associated with the selected IAT types is added to the new group and given a group designation number. If a fuel bundle associated with one of the selected IAT types already belongs to another bundle group, the fuel bundle is removed from the other bundle group and is added exclusively to the new group.

In one embodiment, if less than all of the fuel bundles of a given IAT type are desired in the new bundle group, the core designer may use the Wizard to add all fuel bundles of the given IAT type to the new group. Then, the core designer may remove the fuel bundle(s) not desired in the new group manually using above-described methods.

As discussed above, the group designation number is the lowest available unique natural number available for group designation. For example, if groups "1", "2" and "3" currently exist in the loading map, the new group would be designated as group "4". In this example, the number "4" would appear in the upper left portion of each fuel bundle assigned to group "4". In another example, if groups "1", "3" and "4" currently exist in the loading map, the new group would be designated as group "2". In this example, the number "2" would appear in the upper left portion of each fuel bundle assigned to group "2". The process then advances to above-described step S655.

As discussed earlier, bundle groups are divided into exposed bundle groups and fresh bundle groups. Bundles within an exposed bundle group may "shuffle" or be exchanged with other bundles within the same bundle group. In an example optimization algorithm, a minimum of three sets of symmetric bundles may define an exposed bundle group, the exposed bundle group including exposed fuel and/or fresh fuel.

In contrast to exposed bundle groups, fresh bundle groups include only fresh fuel. Bundles within the fresh bundle group are not exchanged or shuffled, as described above with respect to the exposed bundle group, but rather may be modified through a bundle characteristic (e.g., an IAT type) selection.

The core designer selects a list of allowable IAT types for a given fresh bundle group from among a list of all available IAT types for the given fresh bundle group. While step S670 of FIG. 6 as described above shows how IAT types may be selected for inclusion in a new bundle group, an example will now be given where IAT types in an existing fresh bundle group in a current loading map may be modified.

Referring to FIG. 7, the user enters IAT Mode 709 by left 'clicking' on the IAT radio button 709. The core designer then left 'clicks' on a fresh bundle within a previously defined fresh bundle group 722 to reveal a pop-up window as shown in FIG. 9, which displays to the core designer a list of available IAT types 950 for the selected fresh bundle group 722.

Figure 9:
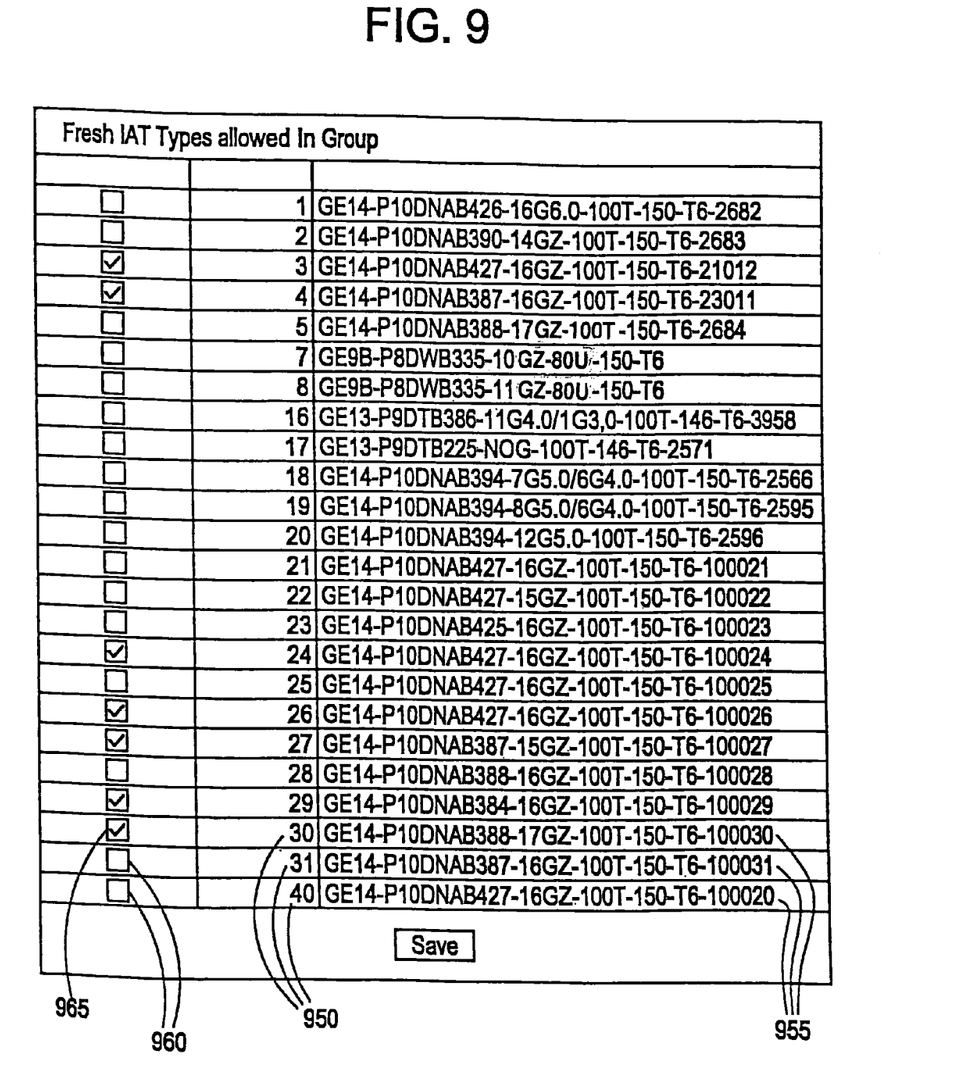
FIG. 9 illustrates a screen shot of a list of available IAT types for a selected fresh bundle group.

Referring to FIG. 9, the core designer may select or de-select among available IAT types 950 with corresponding bundle names 955 and checkboxes 960/965. The core designer selects or de-selects an available IAT type 950 by left clicking on the checkbox 960/965, wherein checkboxes 960 are shown de-selected and checkbox 965 is shown selected. For a current loading map, certain checkboxes 960/965 may be selected automatically (e.g., not by the core designer), thereby indicating IAT types already included in the selected fresh bundle group 722. An optimization of the selected fresh bundle group 722 may be performed if at least two IAT types are selected. Modifying the IAT type of a fresh bundle may change the distribution of enriched uranium and gadolinia within the fresh bundle design.

Criteria for Bundle Group Assignment

Examples of criteria the core designer may consider in assigning fuel bundles to bundle groups will now be described.

In one example, the core designer may desire all fuel bundles with certain IAT types to be included within a bundle group. The core designer may use above-described methods (e.g., manually creating the bundle groups or using the Wizard tool) to create the desired bundle groups.

In another example, consider a situation where the core designer requires that no fresh fuel bundles be loaded into a bundle position adjacent to a control blade (i.e., referred to as a "controlled location"). In this case, the core designer creates a bundle group only including fuel bundles surrounding the controlled locations. The core designer further sets an attribute for the bundle group being that only once burnt fuel bundles (i.e., bundles that have been in the core for only one cycle of operation) may be loaded into the bundle group (e.g., by adding only once burnt fuel bundles with the above-described manual process). During an optimization process, the core designer will only consider proposed loading maps which meet the criteria established for each of the bundle groups. Thus, the core designer uses the attributes which define a bundle group as a constraint, which will be discussed in further detail below.

Bundle Groups as a Constraint in an Optimization Process

An example implementation of the assigned fuel bundle groups as a constraint in an optimization process will now be described.

As described above, fuel bundles within a core may be assigned to one of a plurality of bundle groups. Collectively, the fuel bundle assignments constitute a loading map. During the cycle of operation in a nuclear reactor, the loading map does not change. However, a period between cycles of operation (referred to as an "outage"), reserved for general maintenance of the reactor, may include a repositioning of fuel bundles within the core. The fuel bundles repositioned during the outage may be designated in a selected loading map for a next cycle of operation. The selected loading map may be one of a plurality of loading maps evaluated. The selection may be based on a trial and error process by a core designer and/or by an evaluation result of an objective function. The objective function methodology is disclosed in U.S. application Ser. No. [10/246,716], titled METHOD AND APPARATUS FOR EVALUATING A PROPOSED SOLUTION TO A CONSTRAINT PROBLEM, by a subset of inventors of the subject application, the entirety of which is herein incorporated by reference.

The established bundle groups may serve as a constraint by limiting the number of proposed loading maps to be considered (e.g., by either the core designer and/or the objective function). The constraint is that fuel bundles may only be exchanged with other fuel bundles of the same bundle group within the same region of symmetry. The region of symmetry may refer to any of the above-described symmetry regions, including a quadrant (e.g., a quarter of the entire core as implemented in the United States), a semi (e.g., half of the entire core as implemented in Europe), an octant, etc. Since fuel bundle exchanges are often the "bottleneck" of the outage (e.g., the duration of the outage may scale with the number of fuel bundle movements), the duration of the outage may be reduced by limiting exchanges between fuel bundles (e.g., within the region of symmetry) to fuel bundles within the region of symmetry since these exchanges require less time. Thus, before evaluating a proposed loading map, proposed loading maps including violations of the above-described bundle group constraints are culled and removed from consideration. Then, the reduced set of proposed loading maps may be configured for inclusion within an objective function for evaluation by the core designer.

Therefore, evaluation time (e.g., by the core designer or the objective function) required to select the loading map for the next cycle of operation may likewise be reduced since fewer loading maps are considered.

The invention being thus described, it will be obvious that the same may be varied in many ways. Such variations are not to be regarded as a departure from the spirit and scope of the invention, and all such modifications as would be obvious to one skilled in the art are intended to be included within the scope of the invention.

We claim:

1. A method of implementing bundle groups as a constraint in an evaluation, comprising:
   creating a plurality of fuel bundle groups in a current loading map;
   generating a first plurality of proposed loading maps to establish potential core loading at a next cycle of operation;
   filtering the plurality of proposed loading maps based on a user-selected symmetry and a user-selected fuel bundle characteristic to create a second plurality of proposed loading maps, the second plurality of proposed loading maps satisfying the user-selected symmetry and the user-selected fuel bundle characteristic;
   configuring an objective function to evaluate the second plurality of proposed loading maps; and
   selecting a loading map from the proposed loading maps with the objective function.

2. The method of claim 1, wherein the filtering includes limiting each fuel bundle movement between the current loading map and each of the second plurality of proposed loading maps to exchanges between fuel bundles satisfying the user-selected symmetry and the user-selected fuel bundle characteristic.

3. The method of claim 1, wherein the region of symmetry is one of octant, quadrant, and semi.

* * * * *